(12) United States Patent
Ju et al.

(10) Patent No.: US 11,338,827 B2
(45) Date of Patent: May 24, 2022

(54) AUTONOMOUS VEHICLE AND SYSTEM FOR AUTONOMOUS VEHICLE

(71) Applicant: Apollo Intelligent Driving Technology (Beijing) Co., Ltd., Beijing (CN)

(72) Inventors: Lijun Ju, Beijing (CN); Chengfa Wang, Beijing (CN); Junping Wang, Beijing (CN); Fan Yang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 30 days.

(21) Appl. No.: 16/917,403

(22) Filed: Jun. 30, 2020

(65) Prior Publication Data

US 2021/0046952 A1    Feb. 18, 2021

(30) Foreign Application Priority Data

Aug. 15, 2019  (CN) .......................... 201910754014.5
Aug. 15, 2019  (CN) .......................... 201921323905.7

(51) Int. Cl.
    *B60W 60/00*     (2020.01)
    *H04W 4/40*      (2018.01)
    (Continued)

(52) U.S. Cl.
    CPC ...... *B60W 60/0025* (2020.02); *B60W 50/029* (2013.01); *G07C 5/085* (2013.01);
    (Continued)

(58) Field of Classification Search
    CPC .......... B60W 60/0025; B60W 50/029; B60W 2420/42; B60W 2420/52;
    (Continued)

(56) References Cited

U.S. PATENT DOCUMENTS 9,195,232 B1 * 11/2015 Egnor .................. G05D 1/0055
2015/0331422 A1   11/2015 Hambrick
    (Continued)

FOREIGN PATENT DOCUMENTS

JP    2003069485     3/2003
JP    2010019759     1/2010
    (Continued)

*Primary Examiner* — Muhammad Shafi
(74) *Attorney, Agent, or Firm* — Knobbe Martens Olson & Bear LLP

(57) ABSTRACT

Embodiments of the present disclosure relate to an autonomous vehicle and a system for the autonomous vehicle. The system may include a master computing unit configured to control operations of the autonomous vehicle; a slave computing unit communicatively coupled to the master computing unit and configured to control the operations of the autonomous vehicle in response to detecting a failure of the master computing unit; at least one lidar configured to acquire environmental information around the autonomous vehicle; and a switch communicatively coupled to the at least one lidar, the master computing unit and the slave computing unit, and configured to provide the environmental information to the master computing unit and the slave computing unit for controlling the autonomous vehicle.

13 Claims, 3 Drawing Sheets

(51) Int. Cl.
*B60W 50/029* (2012.01)
*G07C 5/08* (2006.01)
*G06F 21/60* (2013.01)
*H04W 88/16* (2009.01)

(52) U.S. Cl.
CPC .......... *H04W 4/40* (2018.02); *B60W 2420/42* (2013.01); *B60W 2420/52* (2013.01); *G06F 21/606* (2013.01); *H04W 88/16* (2013.01)

(58) Field of Classification Search
CPC . B60W 2050/0006; B60W 2050/0292; B60W 50/023; B60W 60/00186; G07C 5/085; H04W 4/40; H04W 88/16; G06F 21/606; G01S 13/865; G01S 13/931; G01S 17/87; G01S 17/931
USPC .......................................................... 701/24
See application file for complete search history.

(56) References Cited

U.S. PATENT DOCUMENTS

| | | | |
|---|---|---|---|
| 2016/0373351 A1* | 12/2016 | Sharma | H04L 45/74 |
| 2018/0174472 A1* | 6/2018 | Rodenbeck | G05D 1/0088 |
| 2019/0009797 A1 | 1/2019 | Lin | |
| 2019/0079513 A1 | 3/2019 | Greenfield | |
| 2019/0318555 A1* | 10/2019 | Hansel | G11C 7/04 |
| 2019/0378412 A1* | 12/2019 | Zhu | G05D 1/0212 |
| 2021/0006571 A1* | 1/2021 | Yi | H04L 63/102 |

FOREIGN PATENT DOCUMENTS

| | | |
|---|---|---|
| JP | 2017047694 | 3/2017 |
| WO | WO2019116795 | 6/2019 |
| WO | WO2019116870 | 6/2019 |

* cited by examiner

AUTONOMOUS VEHICLE AND SYSTEM FOR AUTONOMOUS VEHICLE

CROSS-REFERENCE TO RELATED APPLICATIONS

This application claims priorities to Chinese Applications No. 201910754014.5 and No. 201921323905.7, filed on Aug. 15, 2019 and entitled "Autonomous Vehicle and System for Autonomous Vehicle," the entire disclosures of each of is hereby incorporated by reference.

TECHNICAL FIELD

Embodiments of the present disclosure relate to the field of autonomous driving, and more specifically to an autonomous vehicle and a system for the autonomous vehicle.

BACKGROUND

In an autonomous vehicle, safety is a very important research topic. In case that a component of an automatic control system fails, if the driving security of the autonomous vehicle cannot be ensured, then a very serious accident will easily be caused, thereby affecting the security and practicability of the autonomous vehicle. Therefore, it is necessary to provide a safer autonomous control scheme.

SUMMARY

According to embodiments of the present disclosure, an autonomous vehicle and a system for the autonomous vehicle are provided.

In a first aspect, an embodiment of the present disclosure provides a system for the autonomous vehicle. The system includes: a master computing unit configured to control operations of the autonomous vehicle; a slave computing unit communicatively coupled to the master computing unit and configured to control the operations of the autonomous vehicle in response to detecting a failure of the master computing unit; at least one lidar configured to acquire environmental information around the autonomous vehicle; and a switch communicatively coupled to the at least one lidar, the master computing unit, and the slave computing unit, and configured to provide the environmental information to the master computing unit and the slave computing unit for controlling the autonomous vehicle.

In some embodiments, the at least one lidar includes a plurality of lidars provided at different positions of the autonomous vehicle.

In some embodiments, the system further includes: at least one positioning device communicatively coupled to the switch, and configured to acquire positioning information of the autonomous vehicle and send the positioning information to the switch, where the switch is further configured to send the positioning information to the master computing unit and the slave computing unit.

In some embodiments, the at least one positioning device includes a plurality of independently operating positioning devices.

In some embodiments, the system further includes: at least one camera communicatively coupled to the master computing unit, and configured to acquire an optical image around the autonomous vehicle and send the optical image to the master computing unit.

In some embodiments, the system further includes: a vehicle-to-everything (V2X) device communicatively coupled to the switch, such that the autonomous vehicle communicates with an external device.

In some embodiments, the system further includes: at least one millimeter wave radar communicatively coupled to the master computing unit and the slave computing unit, and configured to acquire a microwave image around the autonomous vehicle and send the microwave image to the master computing unit and the slave computing unit.

In some embodiments, the at least one millimeter wave radar includes a plurality of millimeter wave radars provided at different positions of the autonomous vehicle.

In some embodiments, the system further includes: a security gateway communicatively coupled to the switch and configured to perform safe communication with the external device.

In some embodiments, the system further includes: a black box communicatively coupled to the security gateway and configured to acquire driving-related information of the autonomous vehicle via the security gateway.

In some embodiments, the master computing unit is further configured to: generate a control signal for a vehicle chassis control system of the autonomous vehicle at least partially based on the environmental information.

In some embodiments, the slave computing unit is further configured to: generate, in response to detecting a failure of the master computing unit, the control signal for the vehicle chassis control system of the autonomous vehicle at least partially based on the environmental information.

In a second aspect, an embodiment of the present disclosure provides an autonomous vehicle. The autonomous vehicle includes the system according to the first aspect.

According to embodiments of the present disclosure, the autonomous vehicle can enter the limp mode when any one of the master computing unit or the slave computing unit fails, to ensure the safety of the autonomous vehicle. In this way, at least autonomous driving at L4 level can be achieved.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference numerals in the drawings denote the same or similar elements.

DETAILED DESCRIPTION OF EMBODIMENTS

Figure 1:
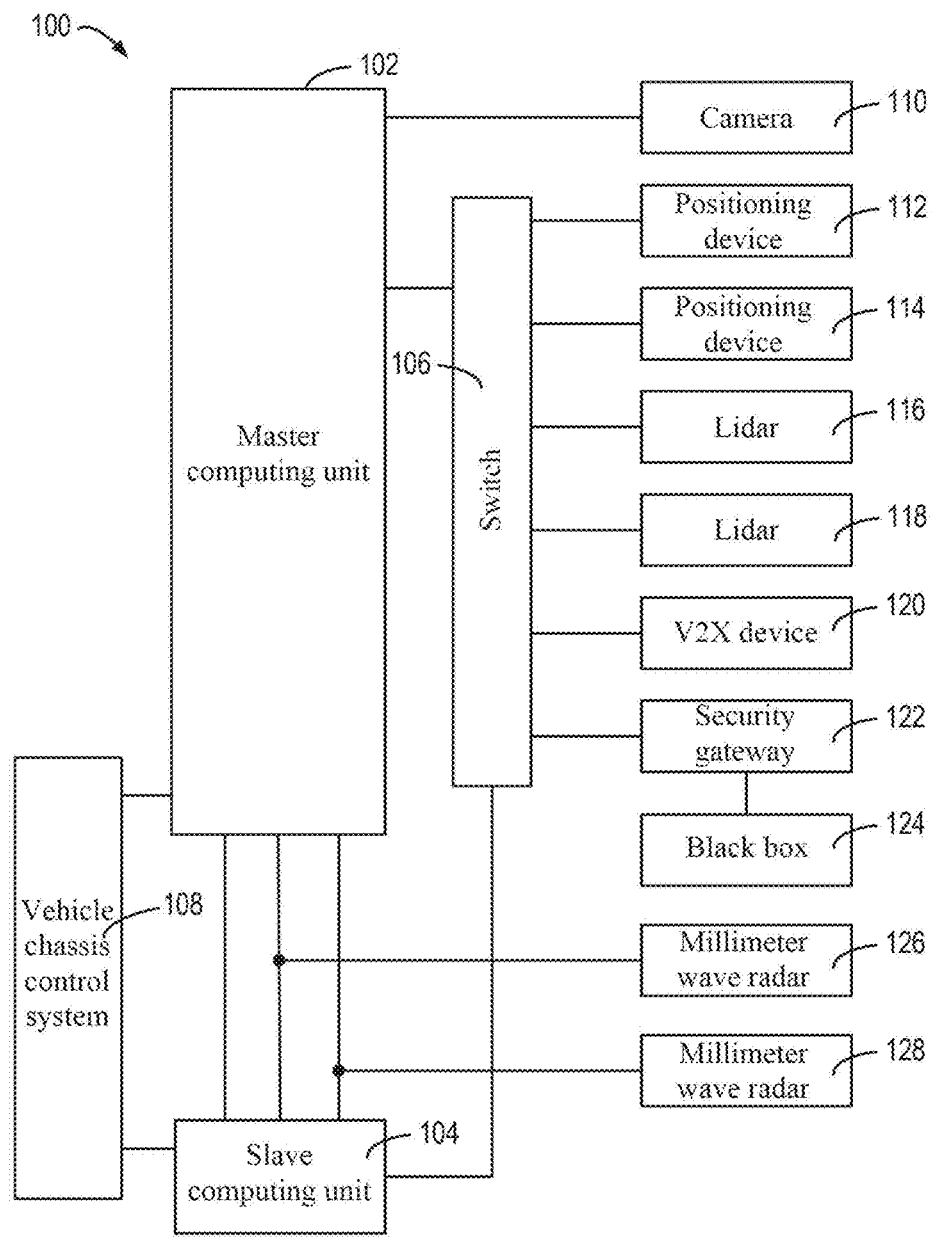
FIG. 1 is a schematic diagram of an autonomous vehicle according to some embodiments of the present disclosure.

The above and other features, advantages and aspects of various embodiments of the present disclosure will become more apparent with reference to the accompanying drawings and detailed descriptions below. The same or similar reference numerals in the drawings denote the same or similar elements.

Now, the concept of the present disclosure will be explained with reference to various example embodiments shown in the accompanying drawings. It should be understood that these embodiments are described merely to enable those skilled in the art to better understand and further implement the present disclosure, and are not intended to impose any limitation on the scope of the present disclosure. It should be noted that like or identical reference numerals may be used in the accompanying drawings where feasible, and like or identical reference numerals may represent like or identical elements. Those skilled in the art will appreciate that from the following description, alternative embodiments of the structures and/or methods described herein may be adopted without departing from the described principles and concepts of the present disclosure.

In the description of embodiments of the present disclosure, the term "include" and the like should be interpreted as open inclusion, i.e., "include but not limited to". The term "based on" should be interpreted as "at least partially based on". The term "one embodiment" should be interpreted as "at least one embodiment". The term "the other embodiment" should be interpreted as "at least one other embodiment". Other terms that may appear but are not mentioned herein shall not be interpreted or defined in a manner contrary to the concept on which embodiments of the present disclosure are based unless explicitly stated.

When describing corresponding embodiments or examples in conjunction with the drawings, the involved direction-related terms are intended to facilitate understanding the description of embodiments of the present disclosure, such as "upper (part)," "lower (part)," "vertical," "horizontal," "longitudinal," "top (part)," and "bottom (part)," which are either based on a direction presented when a reader is viewing a view, or based on a normal use direction of the product, and should not impose an undesirable limitation on the scope of protection of the present disclosure.

FIG. 1 shows a schematic diagram of an autonomous vehicle 100 according to some embodiments of the present disclosure. The autonomous vehicle 100 may be an L4 autonomous vehicle, which has a fully autonomous driving function in a scenario or a working condition to which vehicle design is adapted. As shown in FIG. 1, the autonomous vehicle 100 includes a vehicle chassis control system 108 configured to control a chassis of the autonomous vehicle 100 to drive the vehicle to run.

A master computing unit 102 may determine a control instruction or control signal for the vehicle chassis control system 108 based on information acquired from various sensors or other devices, e.g., information such as vehicle speed, acceleration, deceleration, and driving direction. The master computing unit 102 is communicatively coupled to the vehicle chassis control system 108, and can provide a corresponding control instruction or control signal to the vehicle chassis control system 108, to control operations of the autonomous vehicle 100, such as driving. For example, the master computing unit 102 may be coupled to the vehicle chassis control system 108 through a controller area network (CAN) bus.

A slave computing unit 104 may also determine the control instruction or control signal for the vehicle chassis control system 108 based on information acquired from various sensors or other devices, e.g., information such as vehicle speed, acceleration, deceleration, and driving direction. The slave computing unit 104 is communicatively coupled to the vehicle chassis control system 108, and can provide the corresponding control instruction or control signal to the vehicle chassis control system 108, to control operations of the autonomous vehicle 100, such as driving. For example, the slave computing unit 104 may be coupled to the vehicle chassis control system 108 through the CAN bus.

As shown in FIG. 1, the master computing unit 102 may be communicatively coupled to the slave computing unit 104, for example, through the CAN bus. The slave computing unit 104 may be a computing unit for providing redundant security. The master computing unit 102 and the slave computing unit 104 can monitor the working status of each other, and particularly detect whether the other party fails, to prevent dangers to the autonomous driving. For example, the master computing unit 102 and the slave computing unit 104 can detect whether the other party fails based on a heartbeat message.

For example, the master computing unit 102 may have more complex and complete functions than the slave computing unit 104 has, for use in normal driving. The slave computing unit 104 may have high reliability due to its function of providing a redundant security, but has low complexity and relatively simple functions.

In some embodiments, when the master computing unit 102 detects a failure of the slave computing unit 104, for example, based on a heartbeat message from the slave computing unit 104, the master computing unit 102 can send an instruction to the vehicle chassis control system 108, such that the autonomous vehicle 100 enters a limp mode. In the limp mode, the vehicle chassis control system 108 can perform simple control over the chassis, such that the vehicle can be safely parked in a safe area. When the slave computing unit 104 detects a failure of the master computing unit 102, for example, based on a heartbeat message from the master computing unit 102, the slave computing unit 104 can send an instruction to the vehicle chassis control system 108, such that the autonomous vehicle 100 enters the limp mode. In the limp mode, the vehicle chassis control system 108 can perform simple control over the chassis, such that the vehicle can be safely parked in a safe area.

For example, the autonomous vehicle 100 may further include a camera 110 configured to acquire an optical image around the autonomous vehicle 100. For example, a plurality of cameras 100 may be provided at various positions in the front, the rear, and the like of the autonomous vehicle 100. The camera 100 is coupled to the master computing unit 102 through a communication cable, and provides the acquired optical image to the master computing unit 102, to guide the driving of the autonomous vehicle 100.

As shown in FIG. 1, the autonomous vehicle 100 further includes a switch 106 communicatively coupled to the master computing unit 102 and the slave computing unit 104. The switch 106 serves as a communication hub for the autonomous vehicle 100, and coordinates and transfers services for communication between the master computing unit 102 and the slave computing unit 104 of the autonomous vehicle 100 and other devices such as sensors.

The autonomous vehicle 100 may further include positioning devices 112 and 114 configured to acquire positioning information of the autonomous vehicle 100, to provide services, such as navigation. The positioning devices 112 and 114 can operate independently, and can be implemented by different types of positioning modules. For example, the positioning device 112 may have better performance than the positioning device 114 has, to be used in a normal state, while the positioning device 114 provides services only when the positioning device 112 fails. In some embodiments, the master computing unit 102 and/or the slave computing unit 104 can monitor the status of the positioning devices 112 and 114 through the switch 106, to determine which positioning device is to provide the positioning service. While FIG. 1 shows two positioning devices, those skilled in the art should understand that more or fewer positioning devices may be provided.

As shown in FIG. 1, the autonomous vehicle 100 may further include lidars 116 and 118 configured to acquire environmental information around the autonomous vehicle 100. The lidars 116 and 118 may be provided at different positions of the autonomous vehicle 100, to cover different fields of view. The lidars 116 and 118 are communicatively coupled to the switch 106, and send environmental information to the master processing unit 102 and/or the slave processing unit 104. The master processing unit 102 and/or the slave processing unit 104 may make decisions based on the environmental information. It should be understood that while FIG. 1 shows two lidars, the autonomous vehicle 100 may include more or fewer lidars. The present disclosure is not limited in this regard.

In addition, the autonomous vehicle 100 may further include a V2X device 120, for communicating with other devices. These devices may be any suitable device supporting V2X communication, such as traffic lights. V2X communication is a communication in which a vehicle sends information to and receives information from any other entity that may affect the vehicle. The communication system of the vehicle can provide functions of road safety, traffic efficiency, and energy saving. The V2X device 120 is coupled to the switch 106, such that the master processing unit 102 and/or the slave processing unit 104 can communicate with an external device, thereby providing safer and more efficient autonomous driving control.

In some embodiments, the autonomous vehicle 100 may further include a security gateway 122, to provide safe communication. For example, the security gateway 122 may support a proprietary protocol or a vendor-specific protocol, to provide more security. The security gateway 122 may be connected to an antenna (not shown) to communicate with the external device, for example, to receive an update software package of autonomous driving software running on the master processing unit 102 and/or the slave processing unit 104, such as wireless upgrade (OTA).

The autonomous vehicle 100 may further include a black box 124 that is communicatively coupled to the security gateway 122, for acquiring driving-related information. The driving-related information may include driving instructions generated by the master computing unit 102 and the slave computing unit 104, failure information of each device, and the like. In this way, when an accident such as a car accident occurs, the relevant cause of the accident can be acquired through the black box 124, to better improve the system.

As shown in FIG. 1, the autonomous vehicle 100 may further include millimeter wave radars 126 and 128 configured to acquire a microwave image around the autonomous vehicle 100. The millimeter wave radar can acquire obstacle information at a long distance, e.g., 60 m-100 m, to respond to a high-speed scenario or provide judgment. The millimeter wave radars 126 and 128 may be provided at different positions of the autonomous vehicle 100, to cover different directions and positions. The millimeter wave radars 126 and 128 are communicatively coupled to the master computing unit 102 and the slave computing unit 104, to send the microwave image to the master computing unit 102 and the slave computing unit 104. For example, the millimeter wave radars 126 and 128 may be coupled to the two computing units through the CAN bus. It should be understood that while FIG. 1 shows two millimeter wave radars, the autonomous vehicle 100 may include more or fewer millimeter wave radars. The present disclosure is not limited in this regard.

Since the master computing unit 102 and the slave computing unit 104 are provided, the autonomous vehicle 100 can enter the limp mode when any one of the master computing unit 102 or the slave computing unit 104 fails, to ensure the safety of the autonomous vehicle 100. For example, when the master computing unit 102 fails, the autonomous vehicle 100 enters the limp mode. The slave computing unit 104 may provide a control instruction based on the microwave image provided by the millimeter wave radars 126 and 128, to tow the autonomous vehicle 100 to a safe area. When the slave computing unit 104 fails, the autonomous vehicle 100 can also enter the limp mode. In this way, at least L4 autonomous driving can be achieved.

For example, when the switch 106 fails, the master computing unit 102 can determine that the switch 106 fails due to the failure to receive data from the switch 106, and therefore can also enter the limp mode. In the limp mode, the camera 110 and the millimeter wave radars 126 and 128 can still provide corresponding sensing information to the master computing unit 102. Based on such information, the master computing unit 102 can perform simple control over the autonomous vehicle 100, e.g., to tow the autonomous vehicle to a safe area.

When one or more sensors fail, other sensors can provide corresponding sensing information. The master computing unit 102 can determine whether to enter the limp mode based on the sensor failure situation. In the autonomous vehicle 100 shown in FIG. 1, even when any one device in the autonomous driving control system fails, the autonomous vehicle 100 will not have a safety problem. In this way, the L4 autonomous driving security can be ensured.

Figure 2:
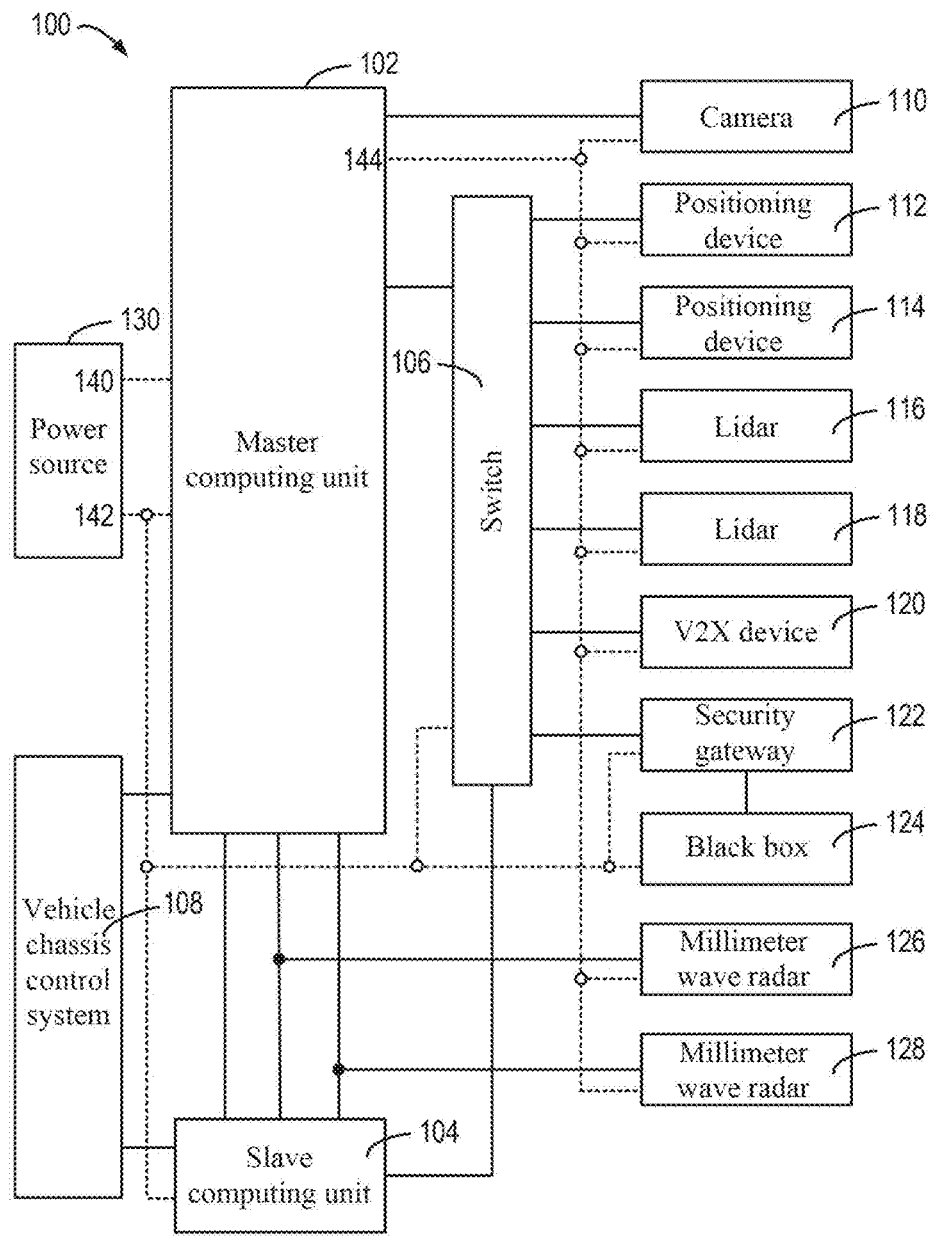
FIG. 2 is a schematic diagram of the autonomous vehicle according to some embodiments of the present disclosure.

FIG. 2 shows a schematic diagram of the autonomous vehicle 100 according to some embodiments of the present disclosure. Compared with FIG. 1, FIG. 2 further shows a power supply system of the autonomous vehicle 100.

As shown in FIG. 2, a power supply unit 130 includes a first power output 140 and a second power output 142. The first power output 140 is coupled to the master computing unit 102, and supplies power to the master computing unit 102. The second power output 142 is coupled to the slave computing unit 104, and supplies power to the slave computing unit 104. In addition, the second power output 142 is also coupled to the master computing unit 102, to provide a startup detection function. Specifically, when detecting the second power output 142, the master computing unit 102 can send a control signal to the vehicle chassis control system 108, to start controlling the vehicle chassis control system 108. In some embodiments, the first power output 140 may be a constant power, and the second power output 142 may be a key power or a start power.

As shown in FIG. 2, the second power output 142 may further be coupled to the switch 106, the security gateway 122, and the black box 124, to supply power to these components.

The master computing unit 102 may further process the first power output 140, to obtain a vehicle-level power output, i.e., a third power output 144. For example, the third power output 144 may be a level above an automotive safety integrity level ASIL-B. The third power output 144 can supply power to the camera 110, the positioning devices 112 and 114, the lidars 116 and 118, the V2X device 120, the millimeter wave radars 126 and 128, and the like.

For example, the master computing unit 102 may include a power management module configured to convert the first power output 140 to the third power output 144. In addition, the first power output 140 further includes a fourth power output (not shown) in the master computing unit 102, which can supply power to main processing modules or components (for example, processors, memories, graphics processors, and neural network processors) in the master computing unit 102. In this way, when the fourth power output of the master computing unit 102 fails, the third power output 144 can still work normally. Alternatively, the power management module can also be provided by a standalone device, instead of the master computing unit 102.

As described above, when detecting a failure of the master computing unit 102, the slave computing unit 104 can automatically take charge of the control over the autonomous vehicle 100. The failure of the master computing unit 102 may include a failure of the fourth power supply output, which causes failure to implement main functions of the master computing unit 102.

If the fourth power output fails, or if the first power output 140 fails in the case of a standalone power management module, then the slave computing unit 104 can receive sensing information, etc. of various devices (e.g., positioning devices, and lidars) from the switch 106, and receive the microwave image from the millimeter wave radars 126 and 128, to perform simple control over the autonomous vehicle 100.

If the second power output 142 fails, the master computing unit 102 can receive the optical image around the autonomous vehicle from the camera 110, to perform simple control over the autonomous vehicle 100.

If the third power output 144 fails, the master computing unit 102 can acquire sensing information from the millimeter wave radars 126 and 128, and perform simple control over the autonomous vehicle 100 based on such sensing information.

In the autonomous vehicle 100 shown in FIG. 2, the power source distribution improves the safety of the autonomous vehicle 100, to prevent the power distribution system failure from causing uncontrollable impacts on the autonomous vehicle 100.

Figure 3:
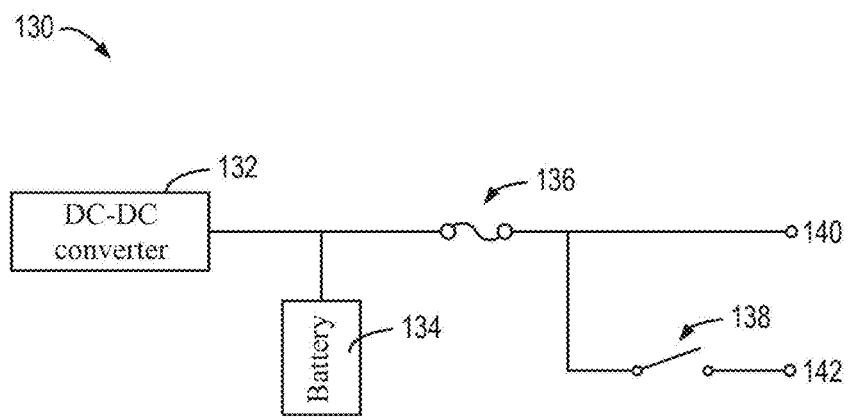
FIG. 3 is a schematic diagram of a power supply unit according to some embodiments of the present disclosure.

FIG. 3 shows a schematic diagram of a power supply unit 130 according to some embodiments of the present disclosure. It should be understood that the power supply unit 130 is merely an example, and those skilled in the art may also use any other suitable power source.

The power supply unit 130 includes a DC-DC converter 132 and a battery 134, such as a storage battery, connected in parallel. The DC-DC converter 132 can convert a power source of the autonomous vehicle 100 into a first power output. For example, the power source may be provided by another storage battery. In this way, a redundant power system may be provided to prevent power failure. For example, if an external power fails and thus the DC-DC converter 132 fails to operate, a backup battery 134 can still supply power. In addition, in some examples, a detection circuit may be provided in the power supply unit 130, to provide a failure of the external power source or the DC-DC converter 132 to the master computing unit 102. When receiving the failure signal, the master computing unit 102 can control the autonomous vehicle 100 to enter a limp mode, to reduce the driving speed, and enter a safe area for parking.

In addition, a fuse 136 is further provided between the DC-DC converter 132 and the first power output and between the battery 134 and the first power output, to provide functions such as overload protection.

As shown in FIG. 3, the power supply unit 130 may further include an on-off switch 138 coupled between the first power output 140 and the second power output 142. Specifically, the on-off switch 138 is coupled between a node between the fuse 136 and the first power output 140 and the second power output 142. The on-off switch 138 can be controlled by a start key or a button of the autonomous vehicle 100, and turning on the on-off switch 138 can trigger startup of the autonomous vehicle 100.

Examples of the power supply unit 130 are introduced above with reference to FIG. 3. However, it should be understood that any other suitable power supply unit 130 may also be provided.

Figure 4:
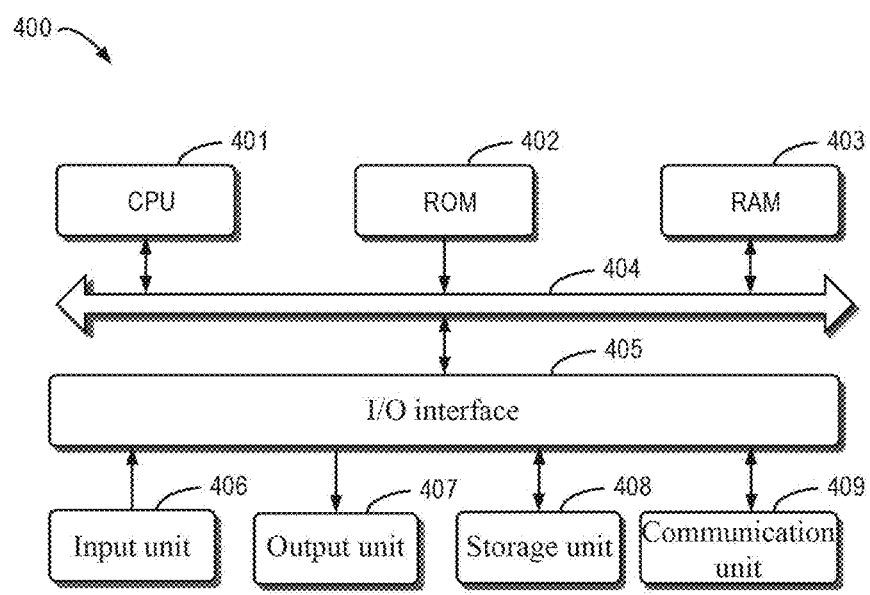
FIG. 4 shows a schematic block diagram of a device that may be configured to implement embodiments of the present disclosure.

FIG. 4 shows a schematic block diagram of a device 400 that may be configured to implement embodiments of the present disclosure. The master computing unit 102 and/or the slave computing unit 104 shown in FIG. 1 and FIG. 2 may be implemented by the device 400. As shown in FIG. 4, the device 400 includes a central processing unit (CPU) 401, which may execute various appropriate actions and processes in accordance with computer program instructions stored in a read-only memory (ROM) 402 or computer program indications loaded into a random access memory (RAM) 403 from a storage unit 408. The RAM 403 may further store various programs and data required by operations of the device 400. The CPU 401, the ROM 402, and the RAM 403 are connected to each other through a bus 404. An input/output (I/O) interface 405 is also connected to the bus 404.

A plurality of components in the device 400 is connected to the I/O interface 405, including: an input unit 406, such as a keyboard, and a mouse; an output unit 407, such as various types of displays and speakers; the storage unit 408, such as a magnetic disk, and an optical disk; and a communication unit 409, such as a network card, a modem, and a wireless communication transceiver. The communication unit 409 allows the device 400 to exchange information/data with other devices via a computer network, e.g., the Internet, and/or various telecommunication networks.

While some specific embodiments of the present disclosure have been shown in detail by way of examples, those skilled in the art should understand that the above examples are intended to be illustrative only, and are not intended to limit the scope of the present disclosure. Those skilled in the art should understand that the above embodiments may be modified without departing from the scope and essence of the present disclosure. The scope of the present disclosure is limited by the appended claims.

What is claimed is:

1. A system for an autonomous vehicle, comprising:
    a master computing unit configured to control operations of the autonomous vehicle;
    a slave computing unit communicatively coupled to the master computing unit and configured to control the operations of the autonomous vehicle in response to detecting a failure of the master computing unit;
    at least one lidar configured to acquire environmental information around the autonomous vehicle; and
    a switch communicatively coupled to the at least one lidar, the master computing unit, and the slave computing unit, and configured to provide the environmental information to the master computing unit and the slave computing unit for controlling the autonomous vehicle.

2. The system according to claim 1, wherein the at least one lidar comprises a plurality of lidars provided at different positions of the autonomous vehicle.

3. The system according to claim 1, wherein the system further comprises:
at least one positioning device communicatively coupled to the switch, and configured to acquire positioning information of the autonomous vehicle and send the positioning information to the switch,
wherein the switch is further configured to send the positioning information to the master computing unit and the slave computing unit.

4. The system according to claim 3, wherein the at least one positioning device comprises a plurality of independently operating positioning devices.

5. The system according to claim 1, wherein the system further comprises:
at least one camera communicatively coupled to the master computing unit, and configured to acquire an optical image around the autonomous vehicle and send the optical image to the master computing unit.

6. The system according to claim 1, wherein the system further comprises:
a vehicle-to-everything (V2X) device communicatively coupled to the switch, such that the autonomous vehicle communicates with an external device.

7. The system according to claim 1, wherein the system further comprises:
at least one millimeter wave radar communicatively coupled to the master computing unit and the slave computing unit, and configured to acquire a microwave image around the autonomous vehicle and send the microwave image to the master computing unit and the slave computing unit.

8. The system according to claim 7, wherein the at least one millimeter wave radar comprises a plurality of millimeter wave radars provided at different positions of the autonomous vehicle.

9. The system according to claim 1, wherein the system further comprises:
a security gateway communicatively coupled to the switch and configured to perform safe communication with the external device.

10. The system according to claim 9, wherein the system further comprises:
a black box communicatively coupled to the security gateway and configured to acquire driving-related information of the autonomous vehicle via the security gateway.

11. The system according to claim 1, wherein the master computing unit is further configured to: generate a control signal for a vehicle chassis control system of the autonomous vehicle at least partially based on the environmental information.

12. The system according to claim 1, wherein the slave computing unit is further configured to: generate, in response to detecting a failure of the master computing unit, the control signal for the vehicle chassis control system of the autonomous vehicle at least partially based on the environmental information.

13. An autonomous vehicle, comprising a system, the system comprising:
a master computing unit configured to control operations of the autonomous vehicle;
a slave computing unit communicatively coupled to the master computing unit and configured to control the operations of the autonomous vehicle in response to detecting a failure of the master computing unit;
at least one lidar configured to acquire environmental information around the autonomous vehicle; and
a switch communicatively coupled to the at least one lidar, the master computing unit, and the slave computing unit, and configured to provide the environmental information to the master computing unit and the slave computing unit for controlling the autonomous vehicle.

* * * * *